United States Patent [19]

Pejcha

[11] 3,864,747

[45] Feb. 4, 1975

[54] MULTIPLE PACK MAGNETIC DISK SYSTEM

[75] Inventor: Ivan Pejcha, San Jose, Calif.

[73] Assignee: Storage Disk Corporation, Louisville, Colo.

[22] Filed: May 29, 1973

[21] Appl. No.: 364,950

[52] U.S. Cl. .................... 360/98

[51] Int. Cl. .................... G11b 17/00

[58] Field of Search .................... 360/63, 98, 103

[56] References Cited

UNITED STATES PATENTS

| | | | |
|---|---|---|---|
| 3,484,760 | 12/1969 | Perkins et al. | 340/174.1 C |
| 3,553,662 | 1/1971 | Goss | 340/174.1 C |
| 3,587,073 | 6/1971 | Ghose | 340/174.1 C |
| 3,657,712 | 4/1972 | Dirks | 340/174.1 C |
| 3,703,713 | 11/1972 | Pohm | 340/174.1 C |

*Primary Examiner*—Vincent P. Canney
*Attorney, Agent, or Firm*—Woodcock, Washburn, Kurtz & Mackiewicz

[57] ABSTRACT

A magnetic disk subsystem includes a plurality of packs of magnetic disks each mounted in nonremovable fashion on a spindle. The pack spindles are mounted on a baseplate with their axes parallel to one another and with the edges of disks of adjoining pack spindles in close proximity one to the other. A single rotary access mechanism includes a plurality of arrays of arms mounted for common rotation, one array for each of said disk packs. Each array includes arms carrying magnetic heads into read/write relationship with the tracks of one pack of magnetic disks. A stationary shaft is affixed to the baseplate and is parallel to and in the middle of the spindles. A positioning rotor is mounted on the shaft. The positioning rotor has a large diameter so that the periphery of the positioning rotor is in close proximity to the edges of the disk pack so that the length of the arms is minimized.

25 Claims, 5 Drawing Figures

MULTIPLE PACK MAGNETIC DISK SYSTEM

BACKGROUND OF THE INVENTION

This invention relates to magnetic disk subsystems and more particularly to a subsystem in which four packs of disks are operated so that they have the characteristics of a single multiple magnetic disk pack.

The IBM 3330 magnetic disk subsystem is typical of the commercially available units in current use for data processing installations. This unit includes a pack of magnetic disks mounted on a common spindle. Read/-write heads are carried into location on the tracks on the disk by a linear access mechanism. Linear access mechanisms carry the heads in a radial direction between the edge and the center of the disk. The disk packs are removable and interchangeable between unlimited number of the 3330 DISC Drives.

While the interchangeability of disk packs has many advantages, it has also imposed many restraints on the operating capability of presently available disk systems. As an example, the access mechanism must be very accurately aligned so that the heads will reproduceably access the same tracks on different disk packs. In spite of this alignment, the interchangeability causes a major positioning error.

There is another restraint on the operating capability of all state of the art disk packs. It is desirable to store blocks of data relating to common subject matter on corresponding tracks of the different disks of a pack. Since the heads are all aligned with the corresponding tracks, data relating to common subject matter can be read out by electronically switching from head to head.

There is no need to change tracks. This is advantageous because it takes a relatively long time to move the heads to a different track. When storing large blocks of data it is desirable to have more disks in the pack. Otherwise, it becomes necessary to store data in other tracks and accessing these other tracks takes time. However, it is not possible to expand indefinitely the number of disks in a pack. There are mechanical limitations, including tolerances, inertia and rigidity, which limit the number of disks which can be rotated on a common spindle and accessed by a single linear access mechanism.

The prior art attempts to operate multiple disk packs in one system include U.S. Pat. No. 3,484,760 - Perkins et al. In this patent four disk packs are accessed by two linear access mechanisms. Such a system would take up a large amount of space because the spacing between the disk packs would have to be large in order to accommodate the linear access mechanisms.

Rotary access mechanisms have long been used for magnetic disk systems. Examples are shown in U.S. Pat. Nos. 2,800,642 and 3,349,381 and 3,412,386 and 3,449,734. To our knowledge, rotary access mechanisms have not been successfully used in multiple disk pack arrangements.

SUMMARY OF THE INVENTION

In accordance with this invention a plurality, more specifically four, pack spindles are mounted with their axes parallel to one another on a baseplate. Each pack spindle consists of a pack of magnetic disks mounted in a nonremovable fashion on a spindle. A rotary access mechanism concurrently rotates magnetic heads into read/write relationship with the corresponding tracks on disks of all four packs.

A disk system in accordance with this invention can be operated so that it has the capability of one multiple high magnetic disk pack. With the access mechanism positioned on one track, it is possible to switch electronically between the heads to read out at least four times as much data as could be stored on corresponding tracks of a single disk pack. Stated another way, in order to access the same volume of data which could be stored on one prior art removable disk pack, the access mechanism of the system of this invention need move across only one-fourth of the number of tracks thereby saving a large amount of valuable system operating time. (Actually, the number of disks in each pack of the present invention is greater than the number on currently available magnetic disk system so the actual savings in access time in the ratio is 1:6 instead of 1:4.)

In carrying out the invention, a timing belt interconnects a drive motor with the four disk spindles. This timing belt provides a nonslipping drive connection between all four spindles so that the relative angular position doesn't change and all four disk packs together have the same readin and readout characteristics as one multiple high disk pack.

Further in accordance with this invention there is a system of servo tracks written on a surface of a disk in one of the packs. A servo arm carries a servo head mounted for common rotation with the four arrays of data heads. The servo head follows the particular servo track and thereby locates the heads on all of the disks in all four disk packs.

Further in accordance with this invention the positioning rotor of the rotary access mechanism has a large diameter so that its periphery is in close proximity to the edges of the disk packs so that the length of the head-carrying arms is minimized. Also the cut-outs between the arms match the circumference of the disks in order to allow the arms to move between the disks but still keep good vertical rigidity. The positioning rotor has a conical or other shaped increase in the opening above the upper bearing to reduce the inertia.

In accordance with a specific embodiment of the invention the access mechanism shaft has a cantilever mounting at one end only so that the disk packs are easily accessible. It is designed with the diameter as large as possible and increasing towards the cantilever end in order to achieve good rigidity. An air-tight seal closes the opening of the positioning rotor on the end of the shaft opposite the cantilever to prevent air circulation over the interface between the shaft and the positioning rotor. This interface includes a pair of preloaded bearings and a sleeve which interacts the thermal expansion differences between the shaft and the bearings on one side and the positioning rotor on the other side.

The arms have lightning holes which reduce the mass of the arm while maintaining good rigidity. In order to obtain good rigidity in horizontal direction arms are generally wedge-shaped with the base being rounded where the base joins the positioning rotor. Thin sheet metal flextures are attached to the arms and carry magnetic heads on the other ends thereof. The heads are placed vertically one below the other and elastic elements between the flextures equalize the force applied by the magnetic heads to the opposed surfaces of the disks. The heads are designed to fly above the recording on an air bearing and land on the surface when the power is turned off and the disks are being stopped.

Further in accordance with this invention, the magnetic disk subsystem includes a baseplate upon which the pack spindles and the access mechanism shaft are firmly mounted. The baseplate supports a system of shrouds, each enclosing one of the disk packs in a self-contained air chamber so that dirt and debris from one chamber cannot be transferred to another chamber. The outer halves of the shrouds are removable in order to allow access to the pack spindles.

The baseplate is a very rigid, typically cast, metal part of a round shape and generally symmetrical around the axis of the cantilever shaft. Four slot openings are provided in 90° intervals in the outside round periphery of the baseplate. The slot openings are provided in order to mount the four spindle housings and have machined surfaces that match with machined surfaces of the spindle housings. Screws are used to mount the spindle housings and keep the machined matching surfaces together without any relative shift. The spindle housings are made out of material of the same coefficient of thermal expansion as the baseplate. This is important because no relative shift due to temperature changes is allowed between the baseplate and the spindle housings.

The baseplate has a machined horizontal surface on which the spindle housing would slide while the disks are being removed sidewise from the array of head arms. This is required because in this particular embodiment the pack shrouds don't allow the heads to be retracted out from the disk packs by rotation of the access mechanism.

An electromagnetic rotor actuator for the access mechanism includes an armature mounted on the positioning rotor and a system of stator magnets mounted in the baseplate. The baseplate is made out of a magnetic material and is shaped to provide magnetic coupling between the armature and the stator magnets.

The baseplate has a round concentric groove deep enough to accommodate an even number of the magnets that are distributed along the groove symmetrically to the center of the baseplate. The air gap between the baseplate and the sides of the magnets is increasing towards the top in order to cut the leakage loss. The groove containing the magnets is covered by a flat magnetic cover that closes the magnetic circuits between the magnets and leaves the desired working air gap for the armature between itself and the top faces of the magnets. A narrow air path is provided on one side of the armature so that turbulent air flow can be induced over the armature for cooling purposes. The magnets are mounted on one side of the armature only so that the required length of the positioning rotor is decreased and at the same time the sizable gaps between magnets do not have to be plugged in order to force the cooling air to go along one surface of the armature.

The foregoing and other objects, features and advantages of the invention will be better understood from the following more detailed description and appended claims.

DESCRIPTION OF THE DRAWINGS

FIG. 5 is a top view, partly in section, of a portion of the magnetic disk subsystem.

DESCRIPTION OF A PARTICULAR EMBODIMENT

Figure 1:
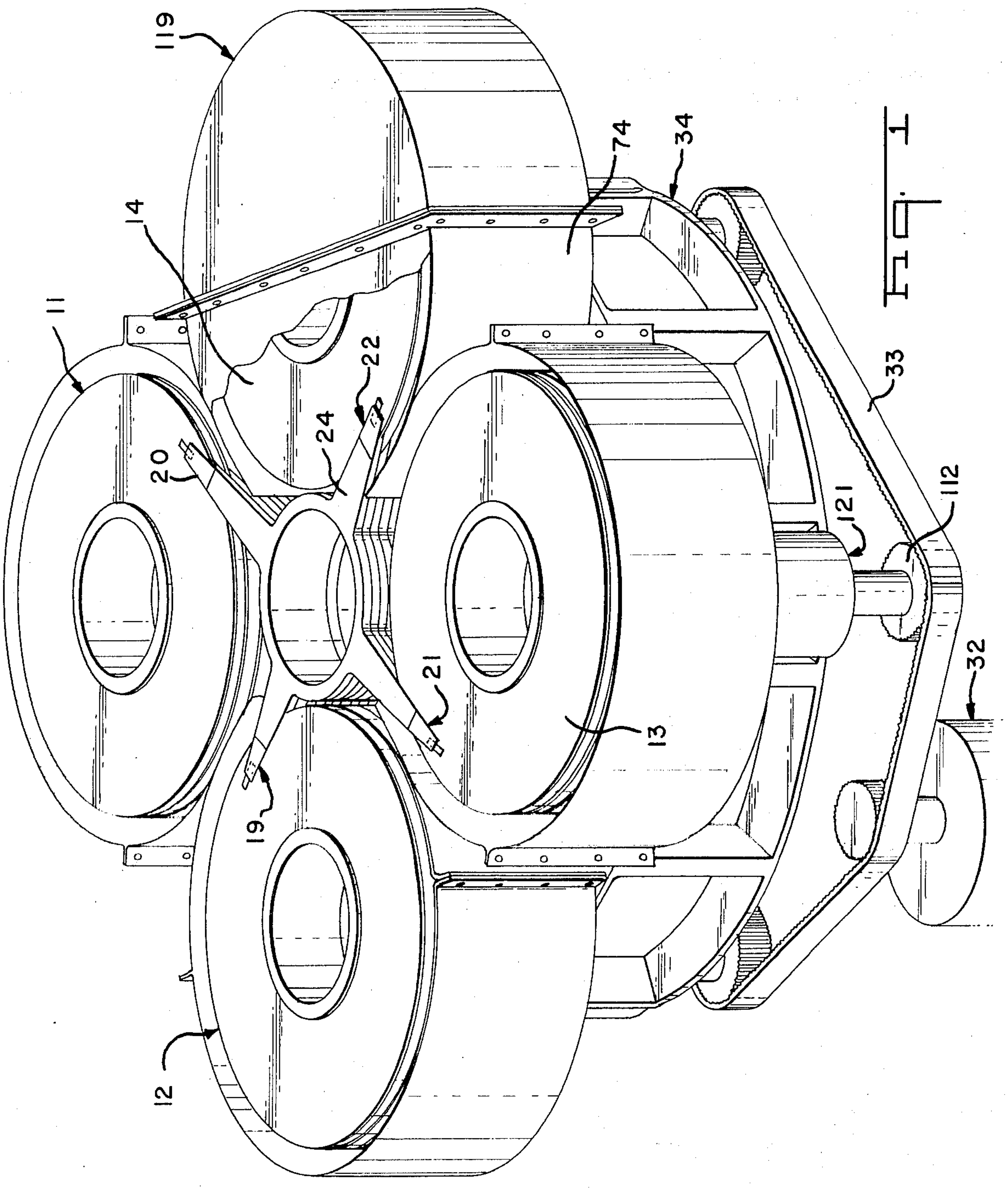
FIG. 1 shows the magnetic disk subsystem of this invention.

The magnetic disk subsystem of this invention includes four pack spindles 11, 12, 13 and 14 mounted with their axes parallel to one another on baseplate 34 (FIG. 1). A rotary access mechanism including positioning rotor 24 concurrently rotates magnetic heads into read/write relationship with the corresponding tracks on disks of all four packs 11 through 14.

A timing belt 33 interconnects a drive motor 32 with the four disk packs 11 through 14. The timing belt has teeth that match with timing pulleys 112 and provide a nonslipping drive connection between all four spindles so that the relative angular position does not change.

The positioning rotor 24 (FIG. 5) has a large diameter so that its periphery is in close proximity to the edges of the disk packs 11 through 14 so that the total length of the arm 25 and head flexture 27 is minimized. Minimization of the length is important in order to obtain good vibration properties necessary for an efficient servo system. Also the cut-outs 54 between the arms match the circumference of the disks in order to allow the arms 25 to move between the disks but still keep good rigidity in vertical direction. The arms 25 have lighting holes 56 which reduce the mass of the arm 25. In order to obtain good rigidity in horizontal direction arms 25 are generally wedge-shaped with the base 60 being rounded where the base joins the positioning rotor 24.

Figure 4:
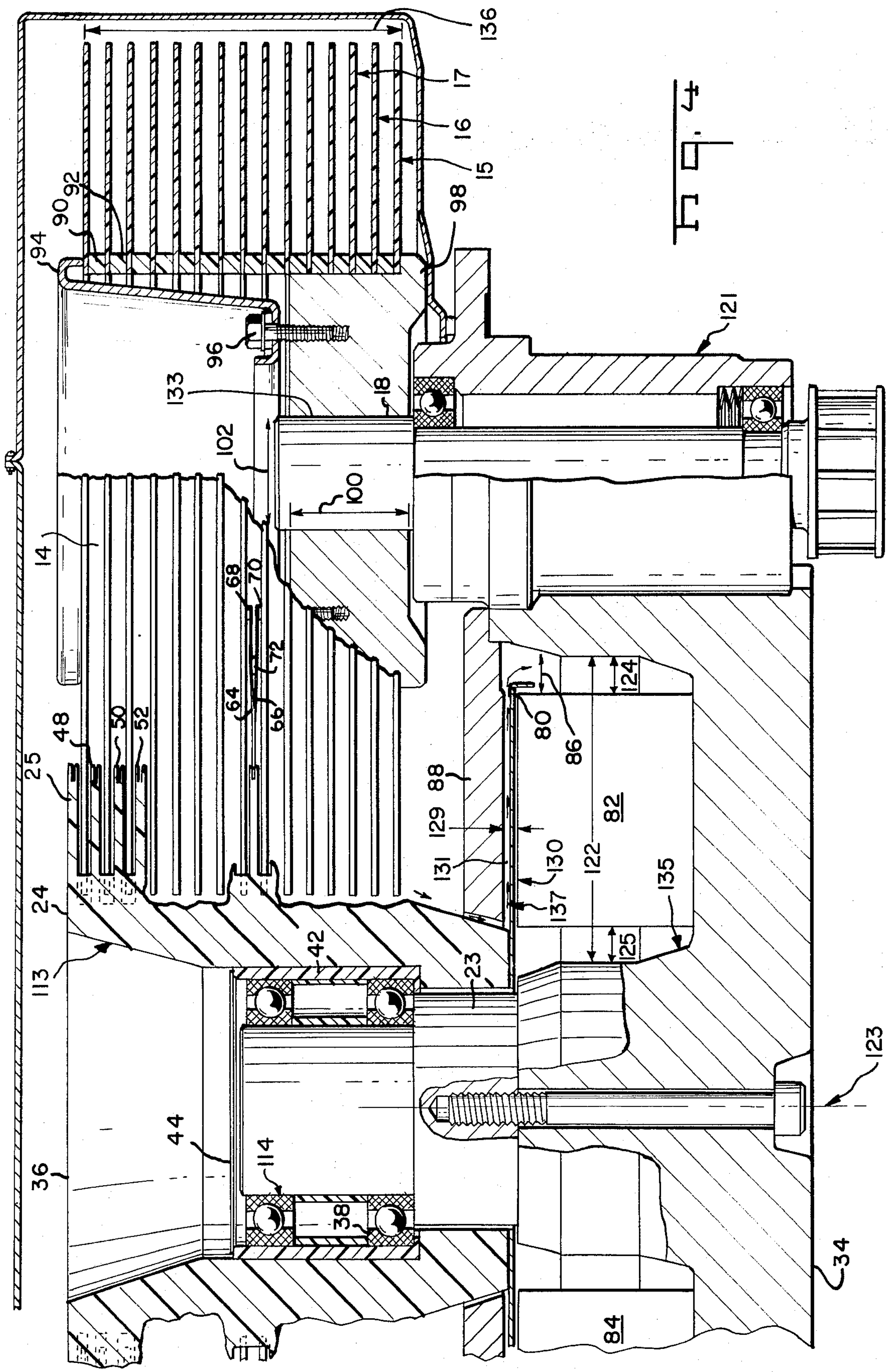
FIG. 4 shows a section through a portion of the disk subsystem.

As shown in more detail in FIG. 4, each pack consists of magnetic disks 136 with the bottom disk 15 resting on a pack base 98 and all mounted in a nonremovable fashion on a spindle 133. The positioning rotor has a conical or other shaped increase 113 in the opening above the upper bearing 114 to reduce the inertia.

An access mechanism shaft 23 has a cantilever mounting at one end only so that the disk packs 11 through 14 are easily accessible. In order to achieve good servo rigidity, the shaft 23 is designed with the diameter as large as possible and increasing towards the cantilever end 135. An air-tight seal 44 closes the opening of the positioning rotor 24 on the upper end of the shaft in order to prevent any oil gases from ball bearings from contaminating the head-disk interface area.

Ball bearings 38 and 114 are preloaded against each other in order to eliminate any internal clearance. A sleeve 42 is pressed onto the rotor in order to interact the thermal expansion differences between the shaft and the bearings on one side and the positioning rotor that typically has higher coefficient of thermal expansion on the other side. This is important because of a fine positioning servo system requiring the rolling resistance torque of the positioning rotor 24 to be constant.

Figure 2:
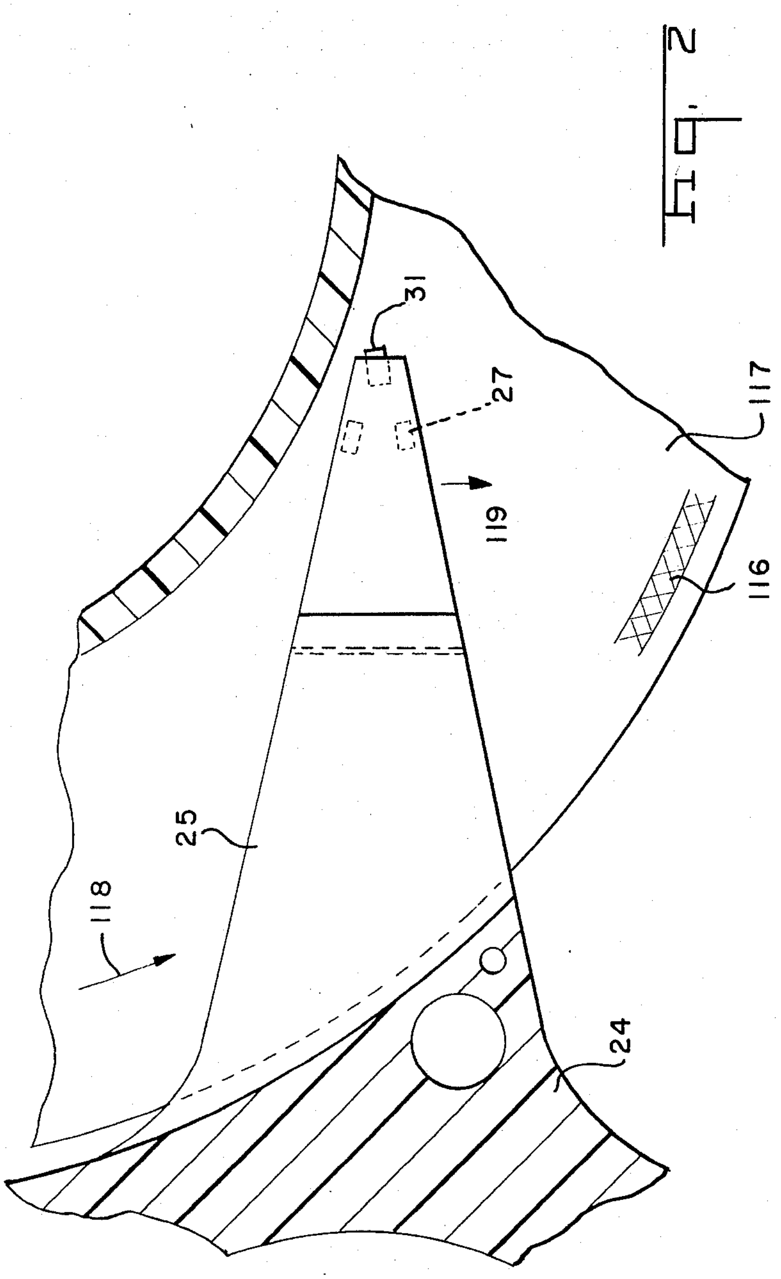
FIG. 2 is a partial top view of the positioning rotor and two of the head couples.
Figure 3:
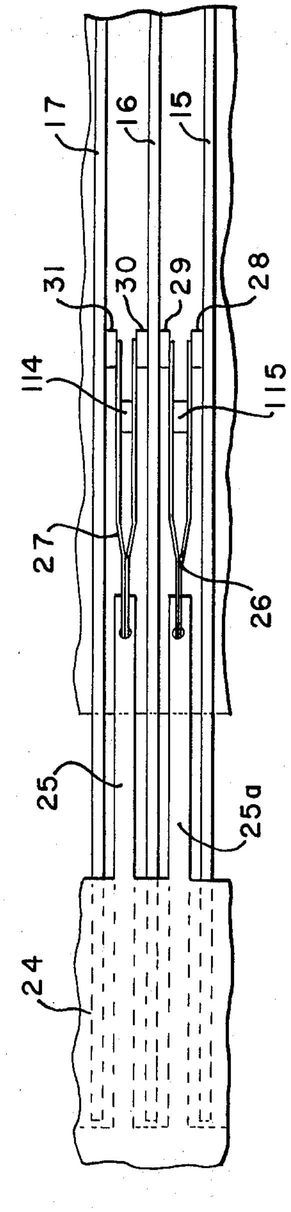
FIG. 3 is a partial side view of the positioning rotor and a head couple.
Figure 7:
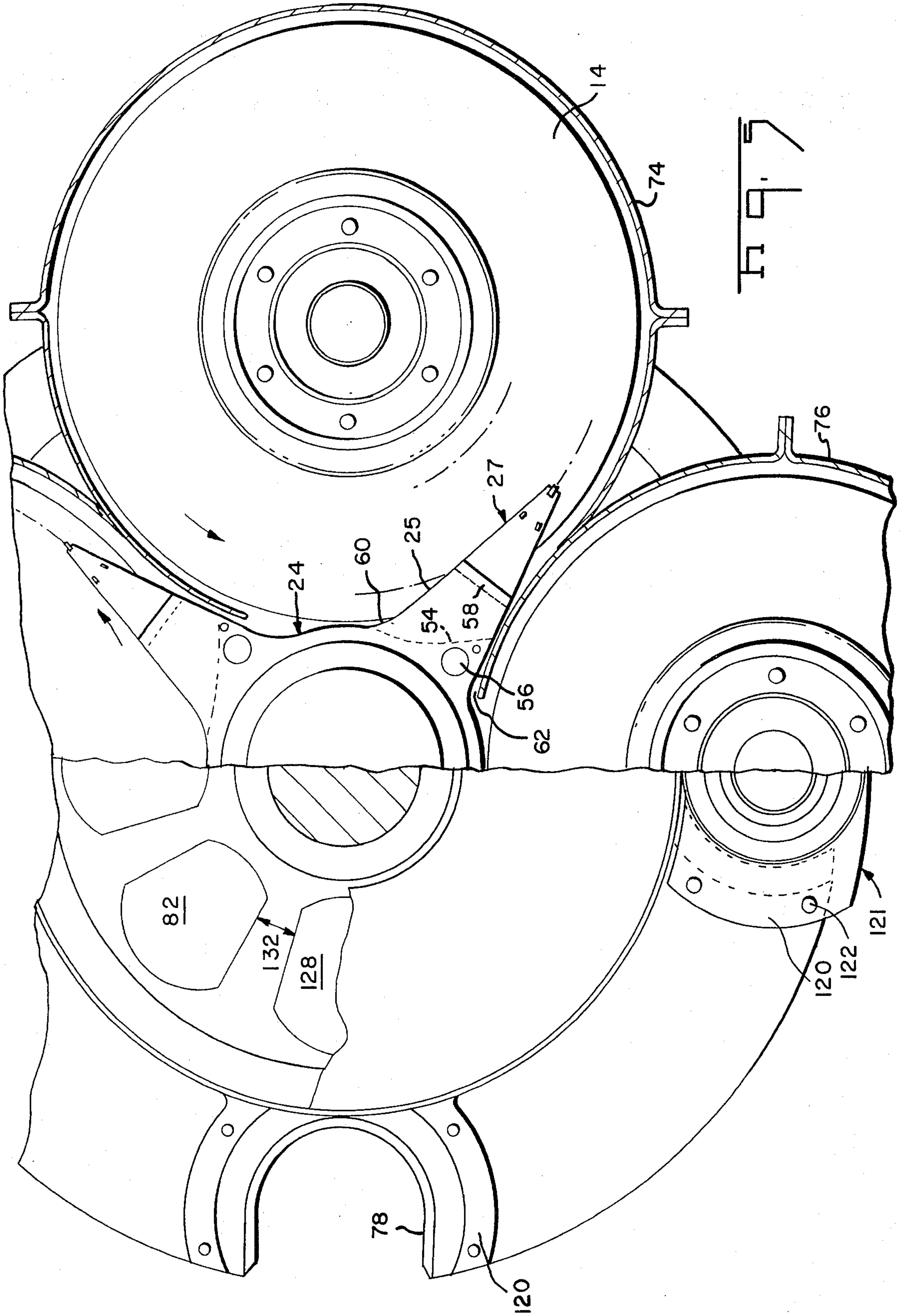

Thin sheet metal flextures 27 (FIGS. 2 and 3) are attached to the arms 25 and carry magnetic heads 28 through 31. The heads 28 through 31 are placed vertically one below the other and elastic elements 114 and 115 between the flextures equalize the forces applied by the magnetic heads 28 through 31 to the opposed surfaces of disks 15 through 17. The heads 28 through 31 are designed to fly above the recording surface 117 on a typically 30 micro inches thick air bearing and land on the designated landing strip 116 when the power is turned off and the disks 15 through 17 are being stopped. The arms 25 are oriented so that the air stream created by the disk rotation 118 carries them automatically in the direction towards and finally above the landing strip 116 in case of power failure of the rotary actuator.

The baseplate 34 upon which the packs 11 through 14 and the access mechanism shaft 23 are firmly mounted also supports a system of shrouds 74 (FIGS. 1 and 5) each enclosing one of the disk packs in a self-contained air chamber so that in case of a head crash only one disk pack would be contaminated. The outer halves of shrouds 119 are removable sidewise to allow access to the packs 11 through 14.

The baseplate 34 is a very rigid casting of a round shape and symmetrical around the axis of the shaft 23. Four slot openings 78 (FIG. 5) are provided at 90° angles in the outside round periphery of the baseplate 34. The slot openings 78 are provided in order to mount the four spindle housings 121 and have machined surfaces that match with machined surfaces of the spindle housings 121. Screws are used in holes 122 to clamp the matching surfaces together without any relative shift. The spindle housings 121 are made out of material of the same coefficient of thermal expansion as the baseplate. This is important because no relative shift due to intermediate changes is allowed between the baseplate and the spindle housings in order to be able to use a servo surface from one pack spindle only.

The baseplate 34 has a machined horizontal surface 120 on which the spindle housing 121 will slide while the disk pack is being removed sidewise from the array of head arms. This is required because in this particular embodiment the pack shrouds 74 do not allow the heads 28 through 31 to be retracted out from the disk packs by rotation of the access mechanism.

An electromagnetic rotor actuator for the access mechanism includes an armature 80 (FIG. 4) mounted on the positioning rotor 24 and a system of stator magnets including 82 and 84 mounted in the baseplate 34. The baseplate 34 is made out of a magnetic material and is shaped to provide magnetic coupling between the armature 80 and the stator magnets.

The baseplate 34 has a round concentric groove with a width 122 between the inner and outer diameters to accommodate eight magnets, including 82 and 84, that are distributed along the groove symmetrically around the center 123 of the baseplate. The air gaps 124 and 125 between the baseplate and the side of the magnets are increasing towards the top face 130 in order to decrease the leakage loss. The groove is covered by a flat magnetic cover 88 that closes the magnetic circuits between the neighboring magnets and leaves the desired working magnetic air gap 129 for the armature between itself and the top face 130 of the magnet 82. A narrow air path 131 is provided on one side of the armature so that turbulent air flow can be induced over the armature for cooling purposes. The magnets are mounted on one side of the armature 80 only so that the required length of the positioning rotor 24 is minimized. At the same time the sizable gaps 132 (FIG. 5) between magnets 82 and 128 do not have to be plugged in order to force the cooling air into a thin turbulent stream along one surface of the armature 80.

Referring to FIG. 4, the aluminum disks 15 are clamped together and towards a pack base 98 by an aluminum clamping bell 94 and screws 96. It is important that the interference fit between the typically aluminum base 98 with higher coefficient of thermal expansion and the typically steel shaft 133 with lower coefficient of thermal expansion provide a reliable press fit at all operating or transportation temperatures. A substantial contact length 100, that should be close to or bigger than the shaft diameter 102, achieves the necessary radial and angular stability in relative position between the axis of rotation of the spindle 18 and the disk pack 136.

What is claimed is:

1. A magnetic disk subsystem comprising:
a plurality of packs of magnetic disks,
a plurality of pack spindles, each pack of disks being mounted in nonremovable fashion on a spindle,
a baseplate, the pack spindles being mounted on said baseplate with their axes parallel to one another and with the edges of disks of adjoining pack spindles in close proximity one to the other,
one single rotary access mechanism including:
a plurality of magnetic heads,
a plurality of arrays of arms mounted for common rotation, one array for each of said disk packs, each array including arms carrying said magnetic heads into read/write relationship with the tracks of one pack of magnetic disks,
a stationary shaft affixed to said baseplate to be parallel to and in the middle of said spindles, and
a positioning rotor mounted for rotation on said shaft, said positioning rotor having a large diameter such that the periphery of said positioning rotor is in close proximity to the edges of said disks whereby the length of said arms is minimized.

2. The system recited in claim 1 wherein the interface between said positioning rotor and said shaft includes:
a pair of preloaded bearings, and
a sleeve which interacts thermal expansion differences between said shaft and bearings on one side and said positioning rotor on the other side, said sleeve having the same coefficient of thermal expansion as said shaft and bearings, said sleeve interacting different radial and axial expansion of said positioning rotor in order to keep preload of said bearings constant.

3. The system recited in claim 1 wherein each of said arms is a rigid extension from said positioning rotor, each rotor extension being created by a cut-out around a radius which matches the circumference of said disks to permit said rotor extensions to move between said disks while maintaining good rigidity.

4. The system recited in claim 1 wherein each of said arms has lightning holes to reduce the mass of said arms while maintaining the rigidity thereof.

5. The system recited in claim 1 wherein each of said arms is generally wedged-shaped with the base thereof being rounded where the base joins the positioning rotor to obtain good rigidity of said arms.

6. The system recited in claim 1 wherein each of said arms holds a pair of flextures, each carrying a magnetic head on the outer end thereof.

7. The system recited in claim 6 wherein said flextures are mounted above each other and are disposed between two recording disks, one carrying a head in read/write relationship with the surface of one of said disks and the other carrying a head in read/write relationship with the opposite surface of the other of said disks, and elastic elements between said pairs of flextures, said elastic elements equalizing the force applied by said heads to the opposed surfaces of said disks.

8. The system recited in claim 1 further comprising:

an electromagnetic rotor actuator having an armature affixed on one end of said positioning rotor.

9. The system recited in claim 8 wherein said positioning rotor has a conical or other shaped increase in the opening at the other end of the armature to reduce the inertia thereof.

10. A magnetic disk subsystem comprising:

a plurality of packs of magnetic disks, a plurality of pack spindles, each pack of disks being mounted on a spindle, said packs being disposed with the spindles parallel to one another and with the edges of disks in adjoining packs in close proximity one to the other, an access mechanism shaft mounted parallel to, and in the middle of said spindles, a plurality of magnetic heads, a single rotary access mechanism mounted on said shaft for rotation, said access mechanism including:

arrays of arms carrying magnetic heads into read/write relationship with the tracks of each pack of magnetic disks, one array of arms being provided for each pack of disks, all of said arrays being commonly rotated by said access mechanism.

11. The system recited in claim 10 wherein there are four pack spindles further comprising a common drive motor for said four spindles.

12. The system recited in claim 10 further comprising:

a common drive motor for said pack spindles, a timing belt interconnecting said motor with said plurality of pack spindles, said timing belt providing a nonslipping drive connection between all pack spindles so that the relative angular position of said disk packs doesn't change with time and all disk packs have the same readout characteristics as one multiple high disk pack on one single spindle.

13. The system recited in claim 10 further comprising a common baseplate for said plurality of pack spindles, said plurality of pack spindles being permanently mounted in a nonremovable fashion on said baseplate.

14. The system recited in claim 10 wherein the magnetic surface on at least one of said magnetic disks is a servo surface, and a servo arm mounted for common rotation with said rotary access mechanism, said servo arm carrying a magnetic head in reading relationship to said servo surface so that the signal produced indicates the track location of the arms of each of said pack spindles.

15. The system recited in claim 10 wherein said shaft has a cantilever mounted at only one end thereof so that said disk packs are easily accessible for servicing and removing.

16. The system recited in claim 15 comprising:

an air tight seal closing the opening of said positioning rotor on the end opposite to said cantilever to prevent circulation of air over the interface between said shaft and said positioning rotor.

17. The system recited in claim 15 wherein said shaft is of increased diameter toward the cantilever end thereby increasing the stiffness of said shaft.

18. A magnetic disk subsystem comprising:

a plurality of packs of magnetic disks, a plurality of pack spindles, each pack of disks being nonremovably mounted on a spindle, a baseplate for said disk system, the pack spindles being mounted on said baseplate parallel to one another and with the edges of disks of adjoining pack spindles in close proximity one to the other, a plurality of magnetic heads, an access mechanism shaft mounted on said baseplate parallel to, and in the middle of said spindles, a single rotary access mechanism mounted for rotation on said shaft, said access mechanism including arrays of arms carrying magnetic heads into read/write relationship with the tracks of each pack of magnetic disks, and a plurality of shrouds, one for each pack of magnetic disks, said baseplate supporting a shroud enclosing each disk pack in a self-contained air chamber so that dirt and debris from one chamber cannot be transferred to another chamber.

19. The system recited in claim 18 wherein the recording disks of each pack are mounted on a disk base, said disk base having a larger coefficient of temperature expansion than said spindle shaft, and a cylindrical interface including a press fit between said disk base and each spindle shaft, the height of said press fit being at least as large as the diameter of said spindle shaft thereby assuring radial and angular stability of the relative position between the disk base and the spindle axis of rotation.

20. The system recited in claim 18 wherein each of said shrouds includes an outer half which is removable to allow access to said pack spindles.

21. The system recited in claim 18 further including an electromagnetic rotor actuator for moving said access mechanism comprising:

an armature mounted for rotating said access mechanisms, and a plurality of stator magnets mounted in said baseplate.

22. The system recited in claim 21 wherein said housing provides a conical shaped opening at the sides of said magnets so that there is a bigger air gap at the top of each side of said magnets so that magnetic flux leakage is minimized.

23. The system recited in claim 21 further comprising:

a cover with good magnetic conductivity positioned adjacent one side of said armature to close the magnetic circuits between adjoining magnets and to provide a narrow air path between said cover and said armature so that turbulent air flow can be induced over said armature for cooling purposes.

24. The system recited in claim 23 wherein said magnets are mounted on one side of said armature only so that the required length of the positioning rotor is minimized and said narrow air passage can be provided on the other side of said armature without plugging the sizable gaps between the magnets.

25. The method of operating a multiple disk pack system in which packs of magnetic disks are mounted on parallel spindles with the edges of the disks in adjacent packs in close proximity one to the other comprising:

concurrently rotating all of the disks on their respective spindles through a nonslipping drive connection between all spindles, rotating an access mechanism carrying magnetic heads into read/write relationship with corresponding tracks on different disks in different packs, and electronically switching said magnetic heads during readout to read said blocks of data pertaining to common subject matter from all packs without changing the position of said magnetic heads from track to track.

* * * * *

PO-1050
(5/69)

UNITED STATES PATENT OFFICE
CERTIFICATE OF CORRECTION

Patent No. 3,864,747 Dated February 4, 1975

Inventor(s) Ivan Pejcha

It is certified that error appears in the above-identified patent and that said Letters Patent are hereby corrected as shown below:

Column 1, line 43, "accessed by" should read --accessed to by--.

Column 4, line 32, "lighting" should read --lightning--.

Column 7, claim 15, line 2, "mounted" should read --mounting--.

Signed and sealed this 29th day of April 1975.

(SEAL)
Attest:

RUTH C. MASON
Attesting Officer

C. MARSHALL DANN
Commissioner of Patents
and Trademarks